United States Patent
Chang et al.

(10) Patent No.: US 9,253,759 B2
(45) Date of Patent: Feb. 2, 2016

(54) SELECTING FROM A PLURALITY OF CHANNELS ACCORDING TO QUALITY OF TEST CARRIERS

(71) Applicant: Realtek Semiconductor Corp., HsinChu (TW)

(72) Inventors: Wei-Hsuan Chang, Taipei (TW); Chung-Yao Chang, Hsinchu County (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 500 days.

(21) Appl. No.: 13/738,943

(22) Filed: Jan. 10, 2013

(65) Prior Publication Data

US 2013/0281144 A1 Oct. 24, 2013

(30) Foreign Application Priority Data

Apr. 20, 2012 (TW) .............................. 101114194 A

(51) Int. Cl.
*H04W 72/04* (2009.01)
*H04W 24/06* (2009.01)
*H04W 72/08* (2009.01)

(52) U.S. Cl.
CPC ............ *H04W 72/04* (2013.01); *H04W 72/085* (2013.01); *H04W 24/06* (2013.01)

(58) Field of Classification Search
None
See application file for complete search history.

(56) References Cited

U.S. PATENT DOCUMENTS

| 7,027,418 | B2 | 4/2006 | Gan |
| 2002/0136268 | A1* | 9/2002 | Gan et al. ...................... 375/133 |
| 2008/0159210 | A1 | 7/2008 | Zaks |

FOREIGN PATENT DOCUMENTS

| CN | 1917694 A | 2/2007 |
| CN | 102098261 A | 6/2011 |
| TW | 200637384 | 10/2006 |

* cited by examiner

*Primary Examiner* — Philip Sobutka
(74) *Attorney, Agent, or Firm* — Winston Hsu; Scott Margo

(57) ABSTRACT

A channel selection method includes steps of generating a plurality of test carriers on a plurality of different candidate channels, respectively; obtaining a plurality of channel quality information corresponding to the plurality of test carriers, respectively; generating a test result according to the plurality of channel quality information; and selecting a target channel from the plurality of candidate channels according to the test result.

8 Claims, 6 Drawing Sheets

| Channel | CH_1 | CH_2 | CH_3 | CH_4 | CH_5 | CH_6 | CH_7 | CH_8 | CH_9 | CH_10 | CH_11 |
|---|---|---|---|---|---|---|---|---|---|---|---|
| Packets | 50 | 80 | 30 | 70 | 40 | 20 | 50 | 10 | 0 | 5 | 30 |
| Weighted scores | 2360 | 2820 | 3000 | 3000 | 2935 | 2935 | 2475 | 1905 | 1625 | 1100 | 865 |

FIG. 2

| Channel | CH_1 | CH_2 | CH_3 | CH_4 | CH_5 | CH_6 | CH_7 | CH_8 | CH_9 | CH_10 | CH_11 |
|---|---|---|---|---|---|---|---|---|---|---|---|
| Packets | 50 | 80 | 30 | 70 | 40 | 20 | 50 | 10 | 0 | 5 | 30 |
| False alarms | 500 | 600 | 400 | 550 | 600 | 350 | 200 | 350 | 300 | 400 | 900 |
| Weighted scores | 2860 | 3420 | 3400 | 3550 | 3535 | 3285 | 2675 | 2255 | 1925 | 1500 | 1765 |

FIG. 3

| Channel | CH_1 | CH_2 | CH_3 | CH_4 | CH_5 | CH_6 | CH_7 | CH_8 | CH_9 | CH_10 | CH_11 |
|---|---|---|---|---|---|---|---|---|---|---|---|
| Base stations (Signal strength > 50%) | 5 | 3 | 0 | 0 | 1 | 3 | 0 | 1 | 0 | 5 | 6 |
| Base stations (Signal strength < 50%) | 3 | 1 | 0 | 0 | 1 | 0 | 0 | 0 | 3 | 1 | 4 |
| Weighted scores | 987 | 969 | 996 | 1125 | 1335 | 1662 | 1551 | 1458 | 1638 | 1587 | 1521 |

FIG. 4

| Channel | CH_1 | CH_2 | CH_3 | CH_4 | CH_5 | CH_6 | CH_7 | CH_8 | CH_9 | CH_10 | CH_11 |
|---|---|---|---|---|---|---|---|---|---|---|---|
| PSD | 60 | 70 | 80 | 60 | 40 | 25 | 25 | 15 | 35 | 80 | 50 |
| Weighted scores | 1950 | 2500 | 2870 | 2535 | 2110 | 1510 | 1285 | 1635 | 1880 | 1700 | 1535 |

FIG. 5

SELECTING FROM A PLURALITY OF CHANNELS ACCORDING TO QUALITY OF TEST CARRIERS

BACKGROUND OF THE INVENTION

1. Field of the Invention

The disclosed embodiments of the present invention relate to channel selection, and more particularly, to a channel selection method using channel quality information of neighboring channels and related channel selection device.

2. Description of the Prior Art

Regarding a wireless communication system, there are various interferences in the air. For example, interferences may be originated from the background, other electronic devices, the same channel or neighboring channels, other wireless communication systems, etc. Therefore, a wireless router or a base station will generally be configured to operate in the spectrum with less interference present, to provide better transmission throughput.

However, when a channel has less interference at a particular moment, this does not mean the channel will always keep that way. When interferences appear, if the energy of the interference is high enough, the receiver may regard the interference signals as regular packets and try to receive the interference signals. Although the interference signals will eventually be unable to be correctly demodulated and be recognized as false alarms, the receiver will be unable to receive normal packets within a period starting from the time the receiver starts receiving the interference signals and ending at the time the false alarms are recognized, which causes retransmission of the normal packets or decreases the transmission rate.

Thus, there is a need to provide a mechanism to avoid severely interfered channels, to ensure better transmission quality and transmission rate.

SUMMARY OF THE INVENTION

In accordance with exemplary embodiments of the present invention, a channel selection method using channel quality information of neighboring channels and related channel selection device are proposed to solve the above-mentioned problem.

According to a first aspect of the present invention, an exemplary channel selection method is disclosed. The exemplary channel selection method includes generating a plurality of test carriers on a plurality of different candidate channels, respectively; obtaining a plurality of channel quality information corresponding to the plurality of test carriers, respectively; generating a test result according to the plurality of channel quality information; and selecting a target channel from the plurality of candidate channels according to the test result.

According to a second aspect of the present invention, an exemplary channel selection method is disclosed. The exemplary channel selection device includes a wireless transmission unit and a channel selection unit. The wireless transmission unit includes a carrier generation module and a wireless transceiver. The carrier generation module is arranged for generating a plurality of test carriers on a plurality of different candidate channels, respectively. The wireless transceiver is coupled to the carrier generation module, and arranged for obtaining a plurality of channel quality information corresponding to the plurality of test carriers, respectively. The channel selection unit includes a calculating module and a determining module. The calculating module is coupled to the wireless transceiver, and arranged for generating a test result according to the plurality of channel quality information. The determining module is coupled to the calculating module, and arranged for selecting a target channel from the plurality of candidate channels according to the test result.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a schematic diagram illustrating a selection result generated by the channel selection device according to a first embodiment of the present invention.

FIG. 3 is a schematic diagram illustrating a selection result generated by the channel selection device according to a second embodiment of the present invention.

FIG. 4 is a schematic diagram illustrating a selection result generated by the channel selection device according to a third embodiment of the present invention.

FIG. 5 is a schematic diagram illustrating a selection result generated by the channel selection device according to a fourth embodiment of the present invention.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to." Also, the term "couple" is intended to mean either an indirect or direct electrical connection. Accordingly, if one device is electrically connected to another device, that connection may be through a direct electrical connection, or through an indirect electrical connection via other devices and connections.

Figure 1:
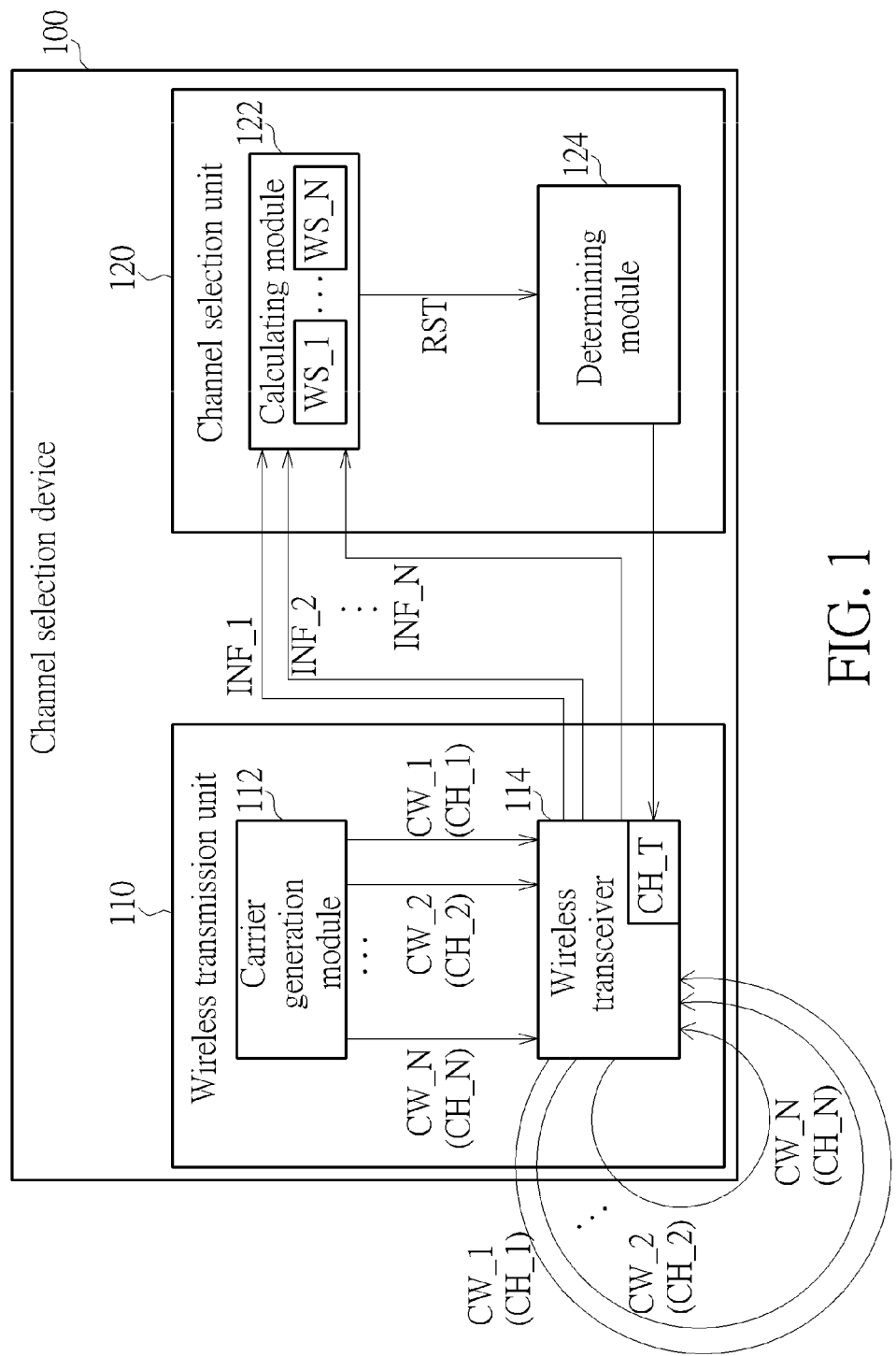
FIG. 1 is a schematic diagram illustrating a channel selection device according to an embodiment of the present invention.

Please refer to FIG. 1, which is a schematic diagram illustrating a channel selection device 100 according to an embodiment of the present invention. The channel selection device 100 includes, but not limited to, a wireless transmission unit 110 and a channel selection unit 120. The wireless transmission unit 110 includes a carrier generation module 112 and a wireless transceiver 114. The carrier generation module 112 is arranged for generating a plurality of test carriers $CW\_1$-$CW\_N$ on a plurality of different candidate channels $CH\_1$-$CH\_N$, respectively. The wireless transceiver 114 is coupled to the carrier generation module 112, and arranged for transmitting and receiving the test carriers $CW\_1$-$CW\_N$, and for obtaining a plurality of channel quality information $INF\_1$-$INF\_N$ corresponding to the test carriers $CW\_1$-$CW\_N$, respectively. The channel selection unit 120 includes a calculating module 122 and a determining module 124. The calculating module 122 is coupled to the wireless transceiver 114, and arranged for generating a test result RST according to the channel quality information $INF\_1$-$INF\_N$. For example, any one of the channel quality information INF_1-INF_N may include the number of false alarms, the number of packets, power spectrum density (PSD), clear channel assessment (CCA), received, the number of base stations found on a corresponding candidate channel (e.g., the candidate channel CH_1 corresponding to channel quality information INF_1), or any combination of any of the foregoing. The determining module 124 is coupled to the calculating module 122, and arranged for selecting a target channel CH_T from the candidate channels CH_1-CH_N according to the test result RST.

In the embodiment of FIG. 1, the channel selection unit 120 selects the target channel CH_T according to the channel quality information INF_1-INF_N. More specifically, the calculating module 122 calculates a plurality of corresponding weighted scores WS_1-WS_N according to the channel quality information INF_1-INF_N, and generates the test result RST according to the weighted scores WS_1-WS_N. In addition, the determining module 124 selects a candidate channel corresponding to the minimum weighted score of the weighted scores WS_1-WS_N as the target channel CH_T, where the minimum weighted score is indicated by the test result RST. For example, if the weighted score WS_3 is the minimum weighted score of weighted scores WS_1-WS_N, the determining module 124 selects the candidate channel (i.e., candidate channels CH_3) corresponding to the weighted score WS_3 as the target channel CH_T. Namely, at this moment, candidate channels CH_3 is the target channel CH_T.

In addition, the manner of generating the weighted scores WS_1-WS_N is detailed as follows: regarding a specific channel quality information INF_X in the channel quality information INF_1-INF_N that corresponds to a specific candidate channel CH_X (X is a given number selected from 1~N), the calculating module 122 determines the specific channel quality information INF_X and the plurality of weightings W0-WM of at least one channel quality information (e.g., the channel quality information INF_X-1, INF_X-2 ..., INF_X+1, INF_X+2 ..., etc.) corresponding to at least one neighboring candidate channel (e.g., the candidate channels CH_X-1, CH_X-2 ... CH_X-M, CH_X+1, CH_X+2 ... CH_X+M, etc.) according to the specific candidate channel CH_X and relative position between the specific candidate channel CH_X and the at least one neighboring candidate channel (e.g., candidate channels CH_X-1, CH_X-2 ... CH_X-M, CH_X+1, CH_X+2 ... CH_X+M, etc.), respectively. Next, the calculating module 122 multiplies the weightings W0-WM with channel quality information (e.g., the channel quality information INF_X-1, INF_X-2 ..., INF_X+1, INF_X+2 ..., etc.) corresponding to the specific channel quality information INF_X and the at least one neighboring candidate channel (e.g., the candidate channels CH_X-1, CH_X-2 ... CH_X-M, CH_X+1, CH_X+2 ... CH_X+M, etc.), respectively, to thereby obtain a plurality of corresponding weighted results WR_1-WR_K, and then the calculating module 122 sums up the weighted results WR_1-WR_K as a weighted score WS_X corresponding to the specific channel quality information INF_X.

Please note that, the concept of the present invention is that, besides the channel quality information of the channel (i.e., specific candidate channels CH_X) used for transmission, calculation of the weighted scores should also include the channel quality information of at least one of the neighboring channels (e.g., candidate channels CH_X-1, CH_X-2 ... CH_X-M, CH_X+1, CH_X+2 ... CH_X+M, etc.). For example, when the specific candidate channel CH_X is the candidate channel CH_5, the neighboring channels may be candidate channels CH_4 and CH_6 which are only one channel away from the candidate channel CH_5, candidate channels CH_3 and CH_7 which are two channels away from the candidate channel CH_5, and so forth. In addition, the nearer a channel in the neighboring candidate channels CH_X-1, CH_X-2 ... CH_X-M, CH_X+1, CH_X+2 ... CH_X+M to the specific candidate channel CH_X, the greater the interference to the specific candidate channel CH_X will be. Hence, the calculating module 122 will employ greater weightings accordingly. For example, if the specific candidate channel CH_X is the candidate channel CH_5, weightings (i.e., weighting W1) corresponding to the candidate channels CH_4 and CH_6 which are one channel away from the candidate channel CH_5 will be greater than weightings (i.e., weighting W2) corresponding to candidate channels CH_3 and CH_7 which are two channels away from the candidate channel CH_5. Namely, the distance between the specific candidate channel CH_X and the at least one neighboring candidate channel (e.g., candidate channels CH_X-1, CH_X-2 ... CH_X-M, CH_X+1, CH_X+2 ... CH_X+M, etc.) is inversely proportional to the weighting (e.g., weightings W0-WM) corresponding to the distance between the specific candidate channel CH_X and the at least one neighboring candidate channel (e.g., candidate channels CH_X-1, CH_X-2 ... CH_X-M, CH_X+1, CH_X+2 ... CH_X+M, etc.). For example, when the specific candidate channel CH_X is the candidate channel CH_5, the calculating module 122 determines the weighting W0 of the candidate channel CH_5 to be 10, the weighting W1 of the candidate channels CH_3, CH_7 and the weighting W2 of candidate channels CH_4, CH_6 to be 9, the weighting W3 of the candidate channels CH_2, CH_8 and the weighting W4 of the candidate channels CH_1, CH_9 to be 7, and the weighting W5 of the candidate channels CH_10 to be 5. However, the weightings determined by the calculating module 122 and the number and positions of the referred neighboring candidate channels may be adjusted according to implementation requirement. The above-mentioned example is for illustrative purposes only, and not meant to be limitations of the present invention.

Please refer to FIG. 2, which is a schematic diagram illustrating a selection result generated by the channel selection device 100 according to a first embodiment of the present invention. The selection result 200 includes a table arranged for storing the number of packets received by the wireless transceiver 114 on the candidate channels CH_1-CH_11 during a period of time, and the weighted scores WS_1-WS_11 corresponding to the candidate channels CH_1-CH_11 calculated by the calculating module 122. In detail, the first row of the table is arranged for indicating the candidate channels CH_1-CH_11, the second row of the table is arranged for recording the number of packets received by the wireless transceiver 114 on the candidate channels CH_1-CH_11 during a period of time (e.g., if the second column of the second row is 50, it means the wireless transceiver 114 has received 50 packets on the candidate channels CH_1 during the period of time), and the third row of the table is arranged for recording the weighted scores WS_1-WS_11 corresponding to the candidate channels CH_1-CH_11 calculated by the calculating module 122 (e.g., if the second column of the third row is 2360, it means the calculating module 122 calculates the weighted score WS_1 corresponding to the candidate channel CH_1 to be 2360).

For example, if the stored weightings W0-W5 determined by the module 122 regarding the candidate channels CH_5 are 10, 9, 9, 7, 7 and 5, respectively, the weightings corresponding to the neighboring candidate channels CH_1-CH_10 will be 7, 7, 9, 9, 10, 9, 9, 7, 7 and 5, respectively, and the weighted results WR_1-WR_10 calculated by the calculating module 122 regarding the candidate channels CH_1-CH_10 will be 350, 560, 270, 630, 400, 180, 450, 70, 0 and 25 (i.e., the number of packets received on the candidate channels multiplying the corresponding weightings), respectively. Next, the calculating module 122 sums up weighted results WR_1-WR_10 and obtains the weighted score WS_5 of the candidate channels CH_5 as 2935 (i.e., the value stored in the sixth column of the third row of the table in FIG. 2). However, it is for illustrative purpose only, and not meant to be limitations of the present invention. As those skilled in the art should readily understand the calculations of the weighted scores regarding other candidate channels after reading above paragraph, detailed description is omitted here for brevity.

In addition, other channel quality information (e.g., the number of false alarms received on the channel) may be used collaboratively with the number of packets received on the channel, to select channels with less interference more precisely. Please refer to FIG. 3, which is a schematic diagram illustrating a selection result generated by the channel selection device 100 according to a second embodiment of the present invention. The selection result 300 includes a table arranged for storing the number of packets received by the wireless transceiver 114 on the candidate channels CH_1-CH_11 during a period of time, the number of false alarms received by the wireless transceiver 114 on the candidate channels CH_1-CH_11 during the period of time, and the weighted scores WS_1-WS_11 corresponding to the candidate channels CH_1-CH_11 calculated by the calculating module 122. In detail, the first row of the table is arranged for indicating the candidate channels CH_1-CH_11, the second row of the table is arranged for recording the number of packets received by the wireless transceiver 114 on the candidate channels CH_1-CH_11 during a period of time (e.g., if the second column of the second row is 50, it means the wireless transceiver 114 has received 50 packets on the candidate channels CH_1 during the period of time), the third row of the table is arranged for recording the number of false alarms received by the wireless transceiver 114 on the candidate channels CH_1-CH_11 during the period of time (e.g., if the second column of the third row is 500, it means the wireless transceiver 114 has received 500 false alarms on the candidate channels CH_1 during the period of time), and the fourth row of the table is arranged for recording the weighted scores WS_1-WS_11 corresponding to the candidate channels CH_1-CH_11 calculated by the calculating module 122 (e.g., if the second column of the fourth row is 2860, it means the calculating module 122 calculates the weighted score WS_1 corresponding to the candidate channel CH_1 to be 2860).

In this embodiment, the calculation of the weighted scores WS_1-WS_11 is substantially the same as that of the weighted scores in FIG. 2. The major difference is that the weighted scores WS_1-WS_11 in the selection result 300 are equal to the weighted scores WS_1-WS_11 in the selection result 200 plus the number of corresponding false alarms received on the channel. For example, if the stored weightings W0-W5 determined by the module 122 regarding the candidate channels CH_5 are 10, 9, 9, 7, 7 and 5, respectively, the weightings corresponding to the neighboring candidate channels CH_1-CH_10 will be 7, 7, 9, 9, 10, 9, 9, 7, 7 and 5, respectively, and the weighted results WR_1-WR_10 calculated by the calculating module 122 regarding the candidate channels CH_1-CH_10 will be 350, 560, 270, 630, 400, 180, 450, 70, 0 and 25 (i.e., the number of packets received on the candidate channels multiplied with the corresponding weightings), respectively. Next, the calculating module 122 sums up the weighted results WR_1-WR_10 and obtains the weighted score WS_5 of the candidate channel CH_5 as 2935 (i.e., the value stored in the sixth column of the third row of the table). However, in this embodiment, the weighted scores WS_5 of the candidate channel CH_5 will need to be increased by 600 (i.e., the value stored in the sixth column of the third row of the table in FIG. 3) which is the number of false alarms received on the candidate channel CH_5, to obtain the weighted score WS_5 as 3535 (i.e., the value stored in the sixth column of the fourth row of the table in FIG. 3). However, it is for illustrative purpose only, and not meant to be limitations of the present invention. As those skilled in the art should readily understand the calculations of the weighted scores regarding other candidate channels after reading above paragraph, detailed description is omitted here for brevity.

In addition, the more base stations are found on a channel, the higher the possibility that other wireless communication transmissions are present on the channel. Therefore, the number of base stations found on the channel is one of the indicators of the channel quality information. It is even possible to obtain signal strength of each base station via beacon packets received by the base stations, and determine different weightings according to the signal strength. The main reason behind this is that when a base station is nearer, transmission signal will be stronger and have greater influence on the channel selection device 100, and therefore the corresponding weighting should be larger. Please refer to FIG. 4, which is a schematic diagram illustrating a selection result generated by the channel selection device 100 according to a third embodiment of the present invention. The selection result 400 includes a table arranged for storing the number of base stations found by the wireless transceiver 114 on the candidate channels CH_1-CH_11, and the weighted scores WS_1-WS_11 corresponding to the candidate channels CH_1-CH_11 calculated by the calculating module 122. In detail, the first row of the table is arranged for indicating the candidate channels CH_1-CH_11, the second row of the table is arranged for recording the number of base stations whose the signal strength received by the wireless transceiver 114 on the candidate channels CH_1-CH_11 is greater than 50% (e.g., if the second column of the second row is 5, it means the number of base stations whose signal strength received by the wireless transceiver 114 on the candidate channels CH_1 is greater than 50% is 5), the third row of the table is arranged for recording the number of base stations whose signal strength received by the wireless transceiver 114 on the candidate channels CH_1-CH_11 is less than 50% (e.g., if the second column of the third row is 3, it means the number of base stations whose signal strength received by the wireless transceiver 114 on the candidate channels CH_1 is greater than 50% is 3), and the fourth row of the table is arranged for recording the weighted scores WS_1-WS_11 corresponding to the candidate channels CH_1-CH_11 calculated by the calculating module 122 (e.g., if the second column of the fourth row is 987, it means the calculating module 122 calculates the weighted score WS_1 corresponding to the candidate channel CH_1 to be 987).

In this embodiment, the calculation of the weighted scores WS_1-WS_11 is substantially the same as that of the weighted scores in FIG. 2. The major difference is that the weightings W0-W5 determined by the calculating module 122 in the selection result 400 is different from that in the selection result 200. In general, since the number of base stations is small, some extra weighting will be provided. Regarding base stations within a closer range (i.e., base stations whose signal strength is greater than 50%), the calculating module 122 will grant weightings 15 times larger than that in the selection result 200, and regarding the base stations within a farther range (i.e., base stations whose signal strength is less than 50%), the calculating module 122 will grant weightings 3 times larger than that in the selection result 200. For example, suppose that the stored weightings W0-W5 determined by the calculating module 122 regarding candidate channels CH_5 are 10, 9, 9, 7, 7 and 5, respectively. Regarding base stations within a closer range (i.e., base stations whose the signal strength is greater than 50%), the weightings corresponding to the neighboring candidate channels CH_1-CH_10 will be 105, 105, 135, 135, 150, 135, 135, 105, 105 and 75, respectively. Regarding the base stations within a farther range (i.e., base stations whose signal strength is less than 50%), weightings corresponding to the neighboring candidate channels CH_1-CH_10 will be 21, 21, 27, 27, 30, 27, 27, 21, 21 and 15, respectively. The first weighting results WR_1'-WR_10' calculated by the calculating module 122 regarding base stations within a closer range (i.e., base stations whose signal strength is greater than 50%) are 105, 105, 135, 135, 150, 135, 135, 105, 105 and 75 (i.e., the number of base stations whose signal strength received on the candidate channels CH_1-CH_11 is greater than 50% multiplied with corresponding weightings), respectively, and the second weighting results WR_1"-WR_10" calculated by the calculating module 122 regarding base stations within a farther range (i.e., base stations whose signal strength is less than 50%) are 21, 21, 27, 27, 30, 27, 27, 21, 21 and 15 (i.e., the number of base stations whose signal strength received on the candidate channels CH_1-CH_11 is less than 50% multiplied with corresponding weightings), respectively. Next, the calculating module 122 sums up the weighting results WR_1'-WR_10' and the weighting results WR_1"-WR_10", and obtains the weighted scores WS_5 of the candidate channel CH_5 as 1335 (i.e., the value stored in the sixth column of the fourth row of the table in FIG. 4). However, it is for illustrative purpose only, and not meant to be limitations of the present invention. As those skilled in the art should readily understand the calculations of the weighted scores regarding other candidate channels after reading above paragraph, detailed description is omitted here for brevity.

In addition, power spectrum density may be one of the indicators of the channel quality information. Please refer to FIG. 5, which is a schematic diagram illustrating a selection result generated by the channel selection device 100 according to a fourth embodiment of the present invention. The selection result 500 includes a table arranged for storing power spectrum density measured on the candidate channels CH_1-CH_11, and the weighted scores WS_1-WS_11 corresponding to the candidate channels CH_1-CH_11 calculated by the calculating module 122. In detail, the first row of the table is arranged for indicating the candidate channels CH_1-CH_11, the second row of the table is arranged for recording the power spectrum density measured on the candidate channels CH_1-CH_11 (e.g., if the second column of the second row is 60, it means the power spectrum density measured on the candidate channels CH_1 is 60), and the third row of the table is arranged for recording the weighted scores WS_1-WS_11 corresponding to the candidate channels CH_1-CH_11 calculated by the calculating module 122 (e.g., if the second column of the third row is 1950, it means the calculating module 122 calculates the weighted score WS_1 corresponding to the candidate channel CH_1 to be 1950).

In this embodiment, the calculation of the weighted scores WS_1-WS_11 is substantially the same as that of the weighted scores in FIG. 2. The major difference is that the weightings W0-W5 determined by the calculating module 122 in the selection result 500 is different from that in the selection result 200. Since the power measured on a channel may represent the energies of interferences or noises currently appearing on the channel, it should only be affecting the channel at this moment, physically. Therefore, there is a need to adjust the weightings determined by the calculating module 122. For example, if the weightings W0-W5 determined by the calculating module 122 regarding candidate channels CH_5 are 9, 9, 10, 9 and 9, respectively, the weighted results WR_1-WR_5 calculated by the calculating module 122 will be 360, 360, 400, 360 and 360 (i.e., the power spectrum densities measured on the candidate channels multiplied with the corresponding weightings), respectively. Next, the calculating module 122 sums up the weight results WR_1-WR_5 and obtains the weighted scores WS_5 of the candidate channels CH_5 as 2110 (i.e., the value stored in the sixth column of the third row of the table in FIG. 5). However, it is for illustrative purpose only, and not meant to be limitations of the present invention. Those skilled in the art should readily understand the calculations of the weighted scores regarding other candidate channels after reading above paragraph; detailed description is omitted here for brevity.

In practice, the channel selecting device 100 may include at least one storing unit (not shown in FIG. 1 for brevity) for storing the channel quality information INF_1-INF_N and the weighted scores WS_1-WS_N to be used by operations of the channel selection unit 120. The channel quality information INF_1-INF_N may be implemented using at least one table (e.g., one or more tables) and/or at least one list (e.g., one or more lists). For example, the at least one storing unit mentioned above may be arranged for temporarily storing the number of packets received on the candidate channels CH_1-CH_N during a period of time. In another embodiment, the at least one storing unit mentioned above may be arranged for temporarily storing the number of packets and false alarms received on the candidate channels CH_1-CH_N. In yet another embodiment, the at least one storing unit mentioned above may be arranged for temporarily storing the number of base stations found on the candidate channels CH_1-CH_N. In yet another embodiment, the at least one storing unit mentioned above may be arranged for temporarily storing power spectrum density measured on the candidate channels CH_1-CH_11.

Please note that, implementation of the channel selection device 100 may be adjusted according to actual requirements. For example, the channel selection device 100 may include at least a portion (e.g., part or all) of a wireless communication device (e.g., a router or a base station). In a case where the channel selection device 100 includes a portion of the wireless communication device, the wireless transmission unit 110 may be a transceiver circuit (e.g. an integrated circuit) of the wireless communication device. However, in another case where the channel selection device 100 includes the whole wireless communication device, the channel selection device 100 may be a wireless communication device (e.g., a router or a base station).

Figure 6:
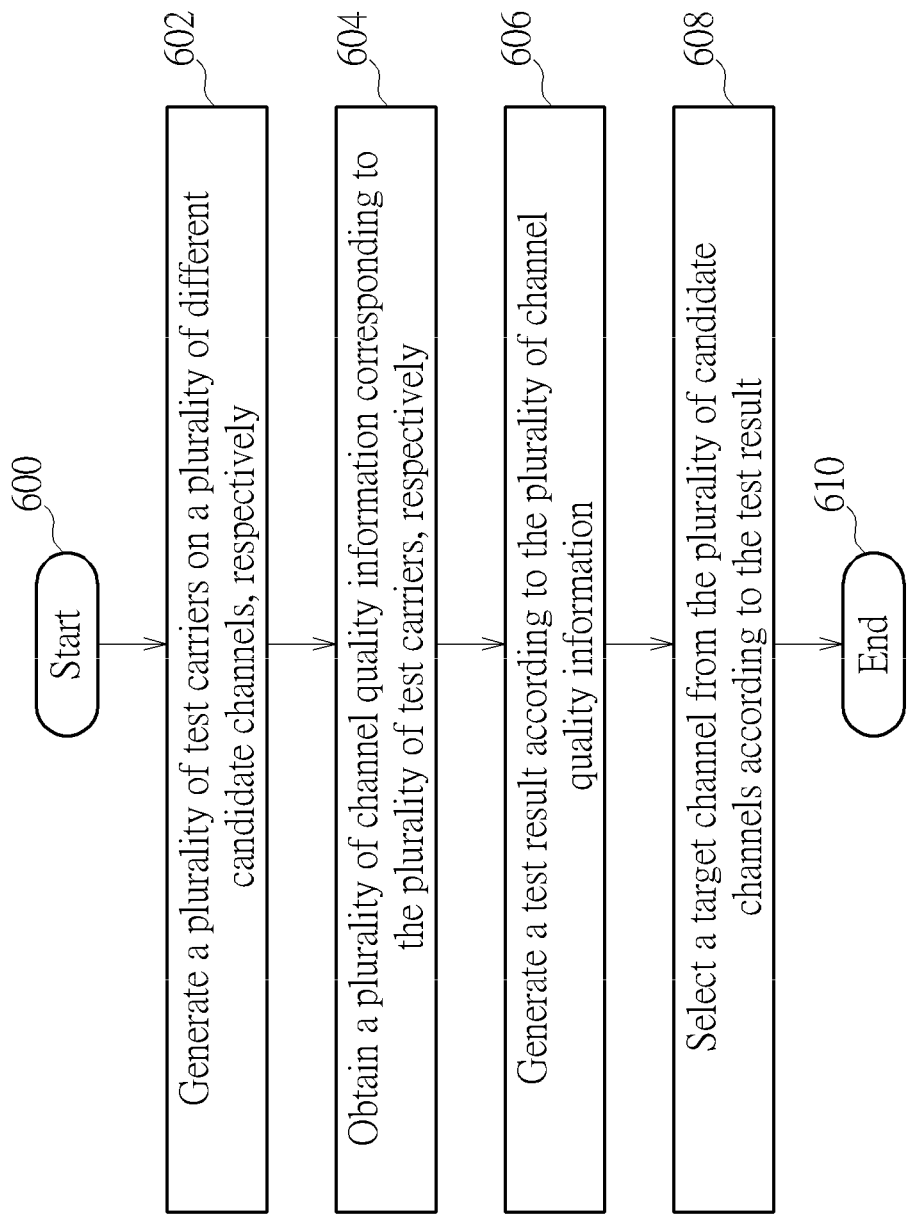
FIG. 6 is a flowchart of a channel selection method according to an embodiment of the present invention.

Please refer to FIG. 6, which is a flowchart of a channel selection method according to an embodiment of the present invention. Please note that, if the result is substantially the same, the steps are not required to be executed in the exact order shown in FIG. 6. The channel selection method may be briefly summarized as follows:

Steps 600: Start.

Steps 602: Generate a plurality of test carriers on a plurality of different candidate channels, respectively.

Steps 604: Obtain a plurality of channel quality information corresponding to the plurality of test carriers, respectively.

Steps 606: Generate a test result according to the plurality of channel quality information.

Steps 608: Select a target channel from the plurality of candidate channels according to the test result.

Steps 610: End.

As those skilled in the art may readily understand operations of the steps in FIG. 6 after reading above paragraphs directed to the channel selection device 100, detailed description is omitted here for brevity.

To sum up, the present invention determines channel quality of a channel which is about to be used for data transmission by referring to channel quality information of at least one neighboring channel residing on nearby spectrum, and selects a channel with least interference to transmit data, thereby mitigating/avoiding effects caused by abrupt interferences or noises.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A channel selection method, comprising:
   generating a plurality of test carriers on a plurality of different candidate channels of a wireless device, respectively;
   obtaining a plurality of channel quality information corresponding to the plurality of test carriers, respectively;
   generating a test result according to the plurality of channel quality information; and
   selecting a target channel from the plurality of candidate channels according to the test result;
   wherein the step of generating the test result according to the plurality of channel quality information comprises:
      calculating a plurality of weighted scores according to the plurality of channel quality information, respectively, and the calculating step comprises: regarding a specific channel quality information corresponding to a specific candidate channel in the plurality of channel quality information:
         determining a plurality of weightings corresponding to the specific channel quality information and channel quality information of the at least one neighboring candidate channel according to relative position between the specific candidate channel and the at least one neighboring candidate channel, respectively;
         obtaining a plurality of weighting results by multiplying the plurality of weightings with the specific channel quality information and channel quality information of the at least one neighboring candidate channel, respectively; and
         summing up the plurality of weighting results as a weighted score corresponding to the specific channel quality information; and
      generating the test result according to the plurality of weighted scores.

2. The channel selection method of claim 1, wherein a distance between the specific candidate channel and the at least one neighboring candidate channel is inversely proportional to the plurality of weightings corresponding to the specific candidate channel and the at least one neighboring candidate channel.

3. The channel selection method of claim 1, wherein the step of selecting the target channel from the plurality of candidate channels according to the test result comprises:
   selecting a candidate channel corresponding to a minimum weighted score in the plurality of weighted scores that is indicated by the test result as the target channel.

4. The channel selection method of claim 1, wherein any one of the plurality of channel quality information comprises a number of received false alarm, a number of received packet, power spectrum density, clear channel assessment, a number of found base station on a corresponding candidate channel, or any combination of any of the foregoing.

5. A channel select device, comprising:
   a wireless transmission unit, comprising:
      a carrier generation module, for generating a plurality of test carriers on a plurality of different candidate channels, respectively; and
      a wireless transceiver, coupled to the carrier generation module, for obtaining a plurality of channel quality information corresponding to the plurality of test carriers, respectively; and
   a channel selection unit, comprising:
      a calculating module, coupled to the wireless transceiver, for generating a test result according to the plurality of channel quality information; and
      a determining module, coupled to the calculating module, for selecting a target channel from the plurality of candidate channels according to the test results;
      wherein the calculating module calculates a plurality of weighted scores according to the plurality of channel quality information, respectively, and generates the test result according to the plurality of weighted scores; and regarding a specific channel quality information corresponding to a specific candidate channel in the plurality of channel quality information, the calculating module determines a plurality of weightings corresponding to the specific channel quality information and channel quality information of the at least one neighboring candidate channel according to relative position between the specific candidate channel and the at least one neighboring candidate channel, respectively; obtains a plurality of weighting results by multiplying the plurality of weightings with the specific channel quality information and channel quality information of the at least one neighboring candidate channel, respectively; and sums up the plurality of weighting results as a weighted score corresponding to the specific channel quality information.

6. The channel select device of claim 5, wherein a distance between the specific candidate channel and the at least one neighboring candidate channel is inversely proportional to the plurality of weightings corresponding to the specific candidate channel and the at least one neighboring candidate channel.

7. The channel select device of claim 5, wherein the determining module selects a candidate channel corresponding to a minimum weighted score in the plurality of weighted scores that is indicated by the test result as the target channel.

8. The channel select device of claim 5, wherein any one of the plurality of channel quality information comprises a number of received false alarm, a number of received packet, power spectrum density, clear channel assessment, a number of found base station on the corresponding candidate channel, or any combination of any of the foregoing.

* * * * *